Sept. 20, 1932.  H. A. CEDERSTROM  1,878,826
COUPLING
Filed March 23, 1931
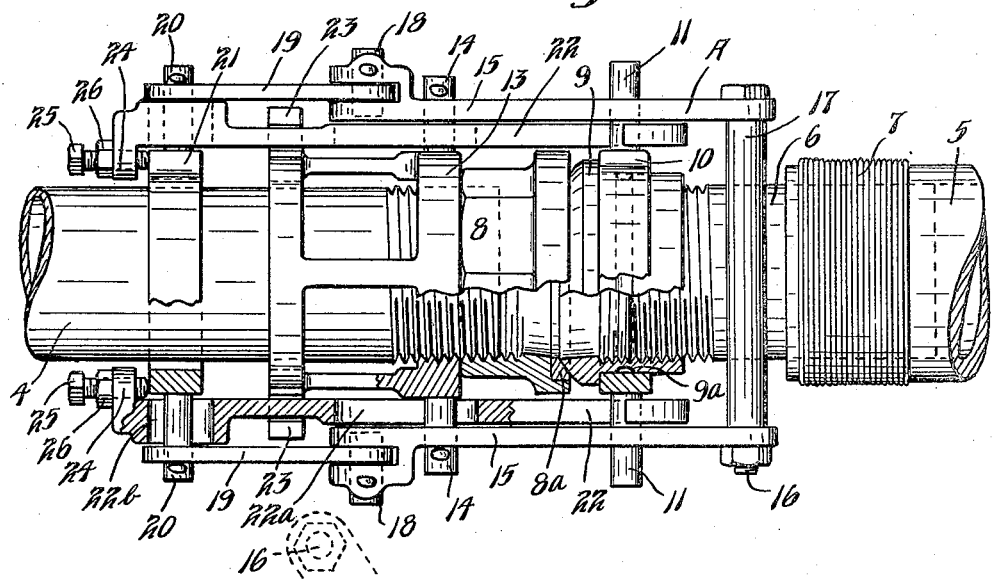
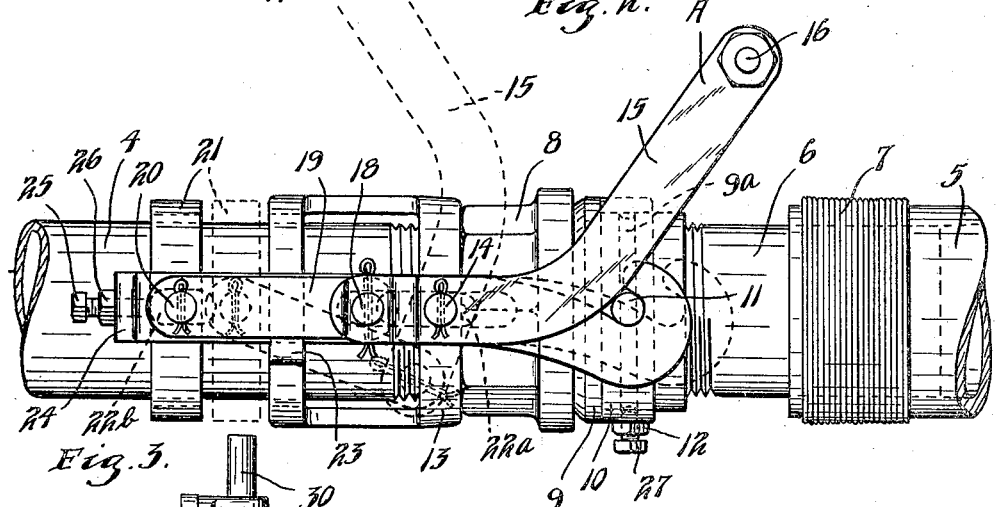
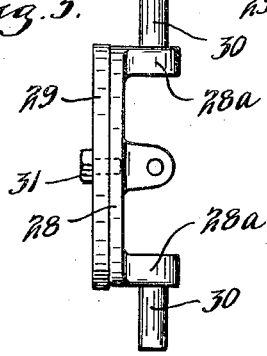
INVENTOR.
HAROLD A. CEDERSTROM
BY HIS ATTORNEYS.

Patented Sept. 20, 1932

1,878,826

UNITED STATES PATENT OFFICE

HAROLD A. CEDERSTROM, OF MINNEAPOLIS, MINNESOTA, ASSIGNOR, BY MESNE ASSIGNMENTS, TO THE ROSCO MANUFACTURING COMPANY, OF MINNEAPOLIS, MINNESOTA, A CORPORATION OF MINNESOTA

COUPLING

Application filed March 23, 1931. Serial No. 524,474.

This invention relates to couplings for quickly connecting and disconnecting a pair of conduits, which conduits may be either a pair of flexible hoses, a pair of pipes or one hose and one pipe.

It is the main object of the present invention to provide a coupling for connecting a pair of conduits, which is of cheap and simple construction and can be operated with a minimum of effort to quickly connect and disconnect the conduits.

A further object of the invention is to provide such a coupling including a pair of mating coupling members, one of which will receive the abrasive wear due to continued usage and is of standard construction so that when it becomes worn, it can be replaced by a similar new coupling member securable from the nearest hardware dealer. Hitherto, although various types of quick attaching and releasing couplings have been provided, most of these couplings include coupling members of special construction, which can only be replaced as they become worn by similar coupling members procured from the particular manufacturer of the complete coupling. Delays have been occasioned through the inability to quickly obtain new coupling members of special construction as the old coupling members become worn. The coupling of the present invention is designed to eliminate the necessity for use of coupling members of special construction.

The objects and advantages of the present invention will more fully appear from the following description made in connection with the accompanying drawing, wherein like reference characters refer to the same or similar parts throughout the various views, and in which, Fig. 1 is a plan view of the coupling of the present invention used to connect a hose to a pipe, certain of the parts being broken away, and having certain portions thereof shown in horizontal section to more clearly illustrate the construction thereof;

Fig. 2 is a view in side elevation of the structure shown in Fig. 1, the movable parts being shown in full lines in the postions they will assume when the hose is coupled to the pipe and being shown in dotted lines in the positions they will assume when the hose is released from the pipe; and Fig. 3 is a plan view illustrating a cap that may be applied over one of the coupling members to protect the seat of the same when not in use.

Referring to the drawing, there is illustrated a portion of a pipe 4 having exterior screw threads formed at its end. A hose 5 is also shown and a nipple 6 is connected to the end of the hose 5 in the usual manner, as by being received within the end of the hose and held in place by means of coiled wire 7. The nipple 6 has exterior screw threads at its free end. A pair of mating coupling members 8 and 9 are provided and these coupling members may be of any desired construction. One of the coupling members 8 or 9 will be applied to the end of the pipe 4; while the other coupling member will be applied to the nipple 6. In the drawing, the coupling member 8 is shown as being screwed onto the end of the pipe 4 and this coupling member forms a female coupling member of a common type of union sold by practically all hardware stores in the country. The coupling member 8 has a polygonal exterior surface to receive a wrench and the polygonal surface joins an exterior flange at the end of the coupling member. The inner portion of the end of the coupling member is rabbeted and carries a ring 8a formed preferably of soft metal, such as copper or the like and providing a seat for a male coupling member. A male coupling member 9 is screwed onto the end of the nipple 6 and preferably this male coupling member is provided with a circular exterior surface joining an exterior flange adjacent the end of the member. The usual male portion is provided at the extreme end of the member 9 for cooperation with the ring 8a of the female coupling member 8. Preferably a groove 9a is cut in the exterior surface of the circular portion of the coupling member 9.

In accordance with the present invention, there is provided a ring 10 which loosely fits over the coupling member 9 and bears against the exterior flange of the coupling member. The ring 10 is adapted for rotation on the coupling member and may be retained on the coupling member by means of a screw 27 carrying a jamb nut 12 and having an inner end adapted to fit within the groove 9a. The ring 10 carries a pair of outwardly projecting pins 11 at diametrically opposite points thereof.

A yoke 13 preferably consisting of a pair of spaced rings interconnected by short bars, is provided and this yoke is applied to the pipe 4 behind the coupling member 8. Preferably the rear ring of the yoke is of slightly greater internal diameter than the exterior diameter of pipe 4, so that it will readily slip over the pipe while the internal diameter of the forward ring of the yoke is the same diameter as the external diameter of the pipe 4, and this forward ring is provided with screw threads permitting the yoke to be screwed onto the screw threaded end portion of the pipe and locked against the rear end of the coupling member 8. The forward ring of the yoke 13 carries a pair of pivot pins 14 at diametrically opposite points and on these pins 14 are mounted the arms 15 of an actuating lever designated by the letter A as an entirety. The two arms 15 of the lever are of substantially angular shape and are joined at their upper ends by a nutted bolt 16 projecting through a spacing collar 17 between the two arms. The lower ends of the arms 15 are forked and the forked portions carry short pivots 18 on which the forward ends of links 19 are pivoted. The rear ends of the links 19 are pivotally mounted on diametrically opposed pins 20 carried by a ring 21 encompassing the pipe 4 rearwardly of the yoke 13 and freely slidable longitudinally of the pipe. A pair of hook members 22 having hook portions at their forward ends adapted to engage the pins 11 on ring 10 from below the same, are mounted for sliding movement in downwardly extending notches in lugs 23 formed at diametrically opposite points on the rear ring of the yoke 13. These two hook members 22 have slots 22a in their medial portions through which the pins 14 project to permit of sliding movement of the hook members relative to the pins 14. Adjacent their rear ends, the hook members have shorter slots 22b formed therein and at their extreme rear ends, the hook members are equipped with inturned apertured and screw threaded lugs 24 within which screws 25 are mounted. The screws 25 bear against the rear side of the ring 21 and may be locked in adjusted position by means of jamb nuts 26.

The operation of the coupling is probably obvious from the above description, but may be briefly explained as follows:—

After the various parts of the coupling have been mounted on a pair of conduits, such as the pipe 4 and hose 5, the hook portions of the hook member 22 will be engaged with the pins 11 and the lever A will be swung downwardly until the arms 15 of the lever strike the pins 11 as stops. In this position, the pivots 18 will be disposed slightly past dead center relation relative to lines taken through the axes of the pins 20, 14 and 11. The screws 25 will then be adjusted in the lugs 24 to move the hook members 22 rearwardly relative to the ring 21 until the two coupling members 8 and 9 tightly engage each other to form a fluid tight joint. When it is desired to release the hose 5 from the pipe 4, the operating lever A will be swung upwardly from the full line position illustrated in Figs. 1 and 2 to the dotted line position shown in Fig. 2. The pivots 18 will, of course, be swung downwardly out of substantially dead center relation relative to lines taken through the pins 20, 14 and 11 and the ring 21 will be slid forwardly on the pipe 4 to release the hook members 22 from engagement with the pins 11. This will of course permit the coupling member 9 to be released from engagement with the coupling member 8 and the hose 5 together with parts attached thereto, may be removed from the vicinity of the pipe 4. When it is desired to again couple the hose to the pipe, the hook portions of the hook members 22 need only be engaged with the pins 11 and lever A swung downwardly to the full line position illustrated. It will be seen that the hose may be very quickly coupled and uncoupled from the pipe. Due to the fact that the ring 10 may rotate on the coupling member 9, perfect alinement of the pins 11 with the pins 14 and pins 20 can always be obtained without twisting the hose 5 or the pipe 4. As either of the coupling members 8 or 9 become worn, through continued usage, the screws 25 may be taken up slightly to adjust for this wear.

When the ring 8a forming the seat for the two coupling members 8 and 9 becomes pitted or worn to such an extent that the two coupling members can not be properly engaged without leakage of the fluid passing through the pipe 4 and hose 5, the coupling member 8 may be quickly removed from the pipe 4 and readily replaced by a stock female coupling member obtained at the nearest hardware dealer. The length of the coupling member used to replace the old coupling member makes no material difference due to the fact that proper adjustment for coupling members 8 of different lengths may be made through the provision of the screws 25 and slots 22b and 22a in the hook members 22. The particular position of the yoke 13 on the pipe 4 makes no material difference because of this adjustable feature of the coupling. Although the coupling member 9 illustrated is not what is known as a standard male coupling member, due to the provision of the circular instead of polygonal exterior surface of the coupling member and the groove 9a, it will be seen that a standard male coupling member having the usual polygonal-shaped surface to receive a wrench and not equipped with a groove 9a, could be easily substituted for the coupling member 9 shown. There is no necessity, however, for making the coupling member 9 of standard construction inasmuch as the coupling member applied to the conduit carrying the yoke 13 will be designed to take the wear between the two coupling members as by inclusion in this coupling member of a ring 8a of soft metal, as shown, and this coupling member, whether a female coupling member or a male coupling member, may be of standard construction of a type readily accessible and on the market. The coupling members 8 and 9 may be of any desired type and either one of the coupling members may be applied to either conduit.

In order that the coupling member 8 may be protected when the coupling member 9 is not attached thereto, a cap 28 illustrated in Fig. 3 is provided, and this cap may be equipped with a gasket 29 of soft material such as rubber, which will fit against the ring 8a of the coupling member 8 to shield the same from grit and other material that might injure the seat formed by the ring. The cap 28 is equipped with diametrically opposed lugs 28a carrying pins 30 which serve a similar function to the pins 11 of the ring 10. The gasket 29 may be removably secured to the cap 28 as by a screw 31.

The coupling is being extensively used for quickly coupling oil hoses to oil pipes and the invention has been amply and successively demonstrated. The coupling can of course be used wherever desired for coupling any two conduits together, or for coupling two rods or shafts together.

It will, of course, be understood that various changes may be made in the form, details, arrangement and proportions of the various parts without departing from the scope of the present invention, which, generally stated, consists in the matter shown and described and set forth in the appended claims.

What is claimed is:—

1. The combination of a pair of conduits, a pair of cooperating coupling members mounted respectively on opposing ends of said conduits, a pivot member applied to one of said conduits rearwardly from the coupling member thereon, a substantially U-shaped lever having arms pivoted to opposite sides of said pivot member, links pivotally connected to the ends of said arms, a ring mounted on the said conduit rearwardly from said pivot member, said links being pivotally connected to said ring, hook members having hook portions at their forward ends and having portions at their rear ends bearing against the rear side of said ring and means on the other of said conduits with which said hook portions are adapted to be engaged.

2. The structure defined in claim 1, the portions at the rear ends of said hook members including lugs rearwardly disposed from said ring and screws mounted in said lugs for adjustment and bearing against said ring.

3. The combination of a pair of conduits, mating coupling members respectively secured to opposing ends of said conduits, a pivot member applied to one of said conduits rearwardly from the coupling member thereon, a lever of substantially U-shape having arms pivotally connected to opposite sides of said pivot member, links pivotally connected to said arms, a ring mounted on said conduit rearwardly from said pivot member and having pivotal connection with said links, hook members having rear portions bearing against said ring and having hooks formed at their forward portions, means for guiding said hook members for sliding movement longitudinally of said conduit and means carried by the other of said conduits with which said hooks are adapted to be engaged.

4. The structure defined in claim 3, said last mentioned means being mounted for rotation on the conduit to which it is applied to permit ready attachment of said hooks thereto without twisting either of said conduits.

5. The structure defined in claim 3, said last mentioned means including a pair of diametrically opposed pins receiving said hooks and acting as stops to limit the swinging movement of said lever in one direction.

6. The combination of a first conduit, a second conduit, a pair of mating coupling members applied respectively to opposing ends of said conduits, a yoke member mounted on said first conduit behind the coupling member thereon, diametrically opposed pins carried by said yoke member, an operating lever of substantially U-shape having arms pivotally mounted on said pins, links pivoted on the free ends of said arms, a ring encircling said first conduit rearwardly from said yoke member, diametrically opposed pins carried by said ring and on which said links are pivoted, hook members having slots extending longitudinally thereof through which said first mentioned and second mentioned pins extend, said hook members having inturned lugs at their rear ends located behind said ring, screws mounted in said lugs and bearing against said ring, said hook members having hooks at their forward ends and diametrically opposed pins carried by the coupling member on said second conduit and with which said hooks are adapted to be engaged, said last mentioned pins acting as stops with which said arms of said operating lever are adapted to engage to limit swinging movement of said operating lever in one direction at a point where the pivots connecting said arms with said links are disposed slightly past dead center relation relative to lines taken through the axes of said first mentioned and second mentioned pins.

7. The combination of a first conduit, a second conduit, mating coupling members screwed on the opposed ends of said respective conduits, a yoke member screwed on said first conduit behind the coupling member thereon, diametrically opposed pins carried by said yoke member, a lever having arms pivoted on said pins, links pivoted to said arms, a ring encompassing said first conduit rearwardly from said yoke member and slidable longitudinally relative to said first conduit, diametrically opposed pins carried by said ring and to which said links are pivotally connected, hook members having longitudinally extending slots therein through which said first mentioned and said second mentioned pins extend, said hook members having inturned lugs rearwardly disposed from said ring, adjustable screws mounted in said lugs and bearing against said ring, said hook members having hooks at their forward ends, said yoke members forming guides for sliding movement of said hook member and diametrically opposed means carried by said coupling member on said second conduit with which said hooks are adapted to be engaged and acting as stops limiting forward swinging movement of said lever.

8. The combination of a pair of conduits, a pair of cooperating coupling members mounted respectively on opposing ends of said conduits, a pivot member applied to one of said conduits, an operating lever pivotally mounted on said pivot member, links pivotally connected to said lever, hooks pivotally connected to said links and projecting towards the remaining conduit upon which said pivot member is not mounted and means carried by said remaining conduit with which said hooks are adapted to be engaged, said means being mounted on said remaining conduit for free rotation to permit ready attachment of said hooks thereto without twisting either of said conduits.

9. In combination with a pair of conduits having terminal portions designed to be coupled in communication with each other, a coupling mechanism comprising a pair of complemental devices mounted respectively on said terminal portions, said devices embodying individual clamping means that are interengageable only when disposed in a particular angular relationship, and one of said clamping means being freely rotatable in a given locus about the axis of its corresponding conduit terminal, whereby it may be manually or substantially automatically flipped to obtain said particular angular relationship regardless of what may be the angular relationship between the said conduit terminal portions.

In testimony whereof I affix my signature.

HAROLD A. CEDERSTROM.